(12) United States Patent
Graeuler et al.

(10) Patent No.: US 11,420,492 B2
(45) Date of Patent: Aug. 23, 2022

(54) ACTUATOR DEVICE FOR AN ADJUSTABLE ROLL STABILIZER OF A MOTOR VEHICLE

(71) Applicant: ZF Friedrichshafen AG, Friedrichshafen (DE)

(72) Inventors: Dirk Graeuler, Belm (DE); Robert Rissling-Staupendahl, Ostercappeln (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/253,409

(22) PCT Filed: Jun. 3, 2019

(86) PCT No.: PCT/EP2019/064288
§ 371 (c)(1),
(2) Date: Dec. 17, 2020

(87) PCT Pub. No.: WO2020/001921
PCT Pub. Date: Jan. 2, 2020

(65) Prior Publication Data
US 2021/0260953 A1 Aug. 26, 2021

(30) Foreign Application Priority Data
Jun. 28, 2018 (DE) ...................... 10 2018 210 637.1

(51) Int. Cl.
*B60G 21/055* (2006.01)
*F16C 19/26* (2006.01)
(Continued)

(52) U.S. Cl.
CPC .......... *B60G 21/0555* (2013.01); *F16C 19/26* (2013.01); *B60G 2202/42* (2013.01);
(Continued)

(58) Field of Classification Search
CPC ............ B60G 21/0555; B60G 2202/43; B60G 2202/442; B60G 2204/122;
(Continued)

(56) References Cited

U.S. PATENT DOCUMENTS 9,434,230 B2 9/2016 Schmitt et al.
10,513,308 B2 12/2019 Jordan et al.
(Continued)

FOREIGN PATENT DOCUMENTS

DE 23 26 190 A1 5/1974
DE 42 14 288 A1 11/1993
(Continued)

OTHER PUBLICATIONS

Description Translation for DE 10 2013 002704 from Espacenet (Year: 2014).*
(Continued)

*Primary Examiner* — James A English
*Assistant Examiner* — Daniel M. Keck
(74) *Attorney, Agent, or Firm* — Finch & Maloney PLLC; Jay S. Franklin; Michael J. Bujold

(57) ABSTRACT

An actuator device (1) for an adjustable roll stabilizer (2) of a motor vehicle, with a housing (4) that extends in the direction of a rotational axis (3) and an actuator (5) arranged in the housing. The actuator device (1) can be operated to twist two stabilizer sections (7a, 7b) relative to one another about the rotational axis (3) and the two stabilizer sections (7a, 7b) are attached to opposite ends (6a, 6b) of the actuator device (1). An engagement contour (8) is formed on the housing (4), which is suitable for immobilizing the housing during the application of torque (M1) to the housing (4) in a direction around the rotational axis (3).

12 Claims, 4 Drawing Sheets

(51) Int. Cl.
    *F16C 19/18*     (2006.01)
    *F16C 35/06*     (2006.01)

(52) U.S. Cl.
    CPC .. *B60G 2202/442* (2013.01); *B60G 2204/122* (2013.01); *B60G 2204/418* (2013.01); *B60G 2204/4191* (2013.01); *B60G 2206/427* (2013.01); *B60G 2206/8201* (2013.01); *B60G 2206/8207* (2013.01)

(58) Field of Classification Search
    CPC ...... B60G 2204/418; B60G 2204/4191; B60G 2206/427; B60G 2206/8201; B60G 2206/8207; B60G 2206/91; F16C 19/26; F16C 19/184; F16C 35/06; F16C 2326/05
    See application file for complete search history.

(56) References Cited

U.S. PATENT DOCUMENTS

2002/0180167 A1* 12/2002 Schmidt ............. B60G 21/0553
                                                             280/5.511
2016/0303940 A1* 10/2016 Krehmer ................ F16D 1/076

FOREIGN PATENT DOCUMENTS

| DE | 10 2008 053 796 A1 | 5/2010 |
| --- | --- | --- |
| DE | 10 2013 009 904 A1 | 12/2013 |
| DE | 10 2013 002 704 A1 | 8/2014 |
| DE | 10 2014 203 242 A1 | 8/2015 |
| DE | 10 2014 205 261 A1 | 9/2015 |
| DE | 10 2015 220 176 A1 | 8/2016 |
| DE | 10 2016 200 177 A1 | 7/2017 |
| DE | 10 2016 219 399 A1 | 8/2017 |
| DE | 20 2011 110 953 U1 | 10/2017 |

OTHER PUBLICATIONS

Description Translation for DE 10 2014 205261 from Espacenet (Year: 2015).*
Description Translation for DE 10 2015 220176 from Espacenet (Year: 2016).*
Description Translation for DE 10 2016 200177 from Espacenet (Year: 2017).*
German Action Corresponding to 10 2018 210 637.1 dated Feb. 13, 2019.
International Search Corresponding to PCT/EP2019/064288 dated Oct. 30, 2019.
Written Opinion Corresponding to PCT/EP2019/064288 dated Oct. 30, 2019.

* cited by examiner

ACTUATOR DEVICE FOR AN ADJUSTABLE ROLL STABILIZER OF A MOTOR VEHICLE This application is a National Stage completion of PCT/EP2019/064288 filed Jun. 3, 2019, which claims priority from German patent application serial no. 10 2018 210 637.1 filed Jun. 28, 2018.

FIELD OF THE INVENTION

The invention relates to an actuator device for an adjustable roll stabilizer of a motor vehicle.

BACKGROUND OF THE INVENTION

In automotive technology, in particular chassis technology, it is known as such to equip motor vehicles with a so-termed roll stabilizer. In its simplest version, this is essentially a C-shaped torsion bar spring which is mounted in its central area so that it can rotate relative to the vehicle body and whose outer ends opposite one another are in each case coupled to a wheel suspension. By virtue of this design, the roll stabilizer ensures that while driving round a curve, not only does the body of the vehicle sinks down on the outer side of the curve (due to the centrifugal force), but also the wheel on the inside of the curve is lowered to some extent (copying behavior).

To further increase the stability of the vehicle and the driving comfort, it is known to make such roll stabilizers adjustable. In that case the roll stabilizer comprises an actuator device and is divided into stabilizer sections that, with the help of the actuator device, can be twisted relative to one another about a rotational axis. By twisting the stabilizer sections relative to one another, a rolling movement of the vehicle body is produce in a controlled manner or a rolling movement of the vehicle body brought about by external influences is counteracted in a controlled manner. Adjustable roll stabilizers are known, whose actuator device comprises an actuator in the form of an electric motor. To achieve suitable rotational speeds or torques, this is often in driving connection with a mechanical gear system, particularly configured as a preferably multi-step planetary gear system. In this connection, reference should be made, for example, to DE 10 2016 219 399 A1.

In the actuator device shown therein, the housing has an essentially rotationally-symmetrical basic shape. An electric motor, that serves as the actuator, and a multi-step planetary gear system are arranged coaxially relative to their common rotational axis. During the manufacture of the actuator device the individual components of the planetary gear system have to be introduced into the housing and secured axially after assembly. A planetary wheel carrier on the drive output side, which in the assembled condition is connected rotationally fixed to a roll stabilizer with a stabilizer section, must be mounted rotatably relative to the housing of the actuator device by means of a roller bearing. From the prior art, it is known to secure the roller bearing axially relative to the housing by means of a locking ring in the form of a circlip. The fitting of the circlip demands considerable force and skill, and adjustability of the axial securing force is hardly possible.

SUMMARY OF THE INVENTION

A purpose of the present invention is to indicate an actuator device of the type mentioned at the start, which provides a simple and reliable way to axially secure the actuator arranged inside the housing and/or components that co-operate with it, in particular components of the gear system.

This objective is achieved by an actuator device according to the independent claim(s). The device is an actuator device for an adjustable roll stabilizer of a motor vehicle, with a housing that extends in the direction of a rotational axis and has an actuator arranged inside it. The actuator device can be operated so as to twist relative to one another about the rotational axis two stabilizer sections that can be attached at opposite ends of the actuator device. According to the invention, the distinguishing feature of the actuator device is that on the housing an engagement contour is formed, which is suitable for immobilizing the housing when a torque directed about the rotational axis is applied to the housing. By means of the engagement contour, in a simple manner and in particular using a suitable tool such as a wrench, the housing of the actuator device can be held rotationally fixed. Advantageously, in that way an immobilizing torque can be produced while an assembly operation is carried out on the housing, which applies to the housing a torque directed around the rotational axis—but in the opposite direction. Such an assembly operation can be, for example, the fitting of a bearing screw connection in order to secure the drive-output-side roller bearing axially relative to the housing. The objective mentioned to begin with is thus achieved in a simply designed manner.

The engagement contour envisaged according to the invention can be designed in various ways. According to an advantageous further development of the actuator device, the housing of the actuator device is essentially rotationally symmetrical. Such a structure is in particular appropriate when an actuator and a gear system are arranged in the housing coaxially relative to the common rotational axis. A housing shape which is relatively simple to produce, which at the same time is suitable and has a high level of fitting-space that can be utilized for accommodating an electric motor and a multi-step planetary gear system, is provided by a substantially cylindrical structure of the housing.

The housing can be made in one piece. Alternatively, the housing can consist of a plurality of segments welded to one another, in particular in the sense of tube segments welded to one another circumferentially.

A preferred further development of the actuator device provides that at the end of the actuator device on the drive output side an output bearing for the rotatable mounting of a gear system component relative to the housing is arranged, which bearing is secured axially relative to the housing by a bearing screw connection, particularly one in the form of a threaded ring. Expediently, for that purpose an internal thread is formed on the housing, into which the threaded ring can be screwed once the output bearing has been fitted, in order to secure the output bearing axially. During the assembly process of screwing in the threaded ring, as the screwing-in progresses an increasing torque is exerted on the housing about the rotational axis so that without immobilizing the housing it would also co-rotate. To avoid damaging the housing, the engagement contour according to the invention can be used for immobilizing it during the fitting of the output-side bearing screw connection.

The engagement contour can be designed in various ways. Preferably, the engagement contour is formed on a housing cover section of the housing, which is arranged on an end of the actuator device opposite the output-side bearing screw connection.

For immobilizing to take place in a simple manner, the engagement contour is a two-faceted, multi-faceted, six-lobed, hexagonal, multi-toothed or similar design.

Advantageously, the engagement contour is produced by machining the housing. In addition or alternatively, the housing can be made at least in part as a forged component with the engagement contour formed on it. Thus, the engagement contour can also be produced completely by forging, in particular without any machining.

BRIEF DESCRIPTION OF THE DRAWINGS

Below, the invention will be explained with reference to an example embodiment and to the drawings. From this, further effects and advantages of the invention will emerge. The drawings show.

DETAILED DESCRIPTION OF THE PREFERRED EMBODIMENTS

Figure 1:
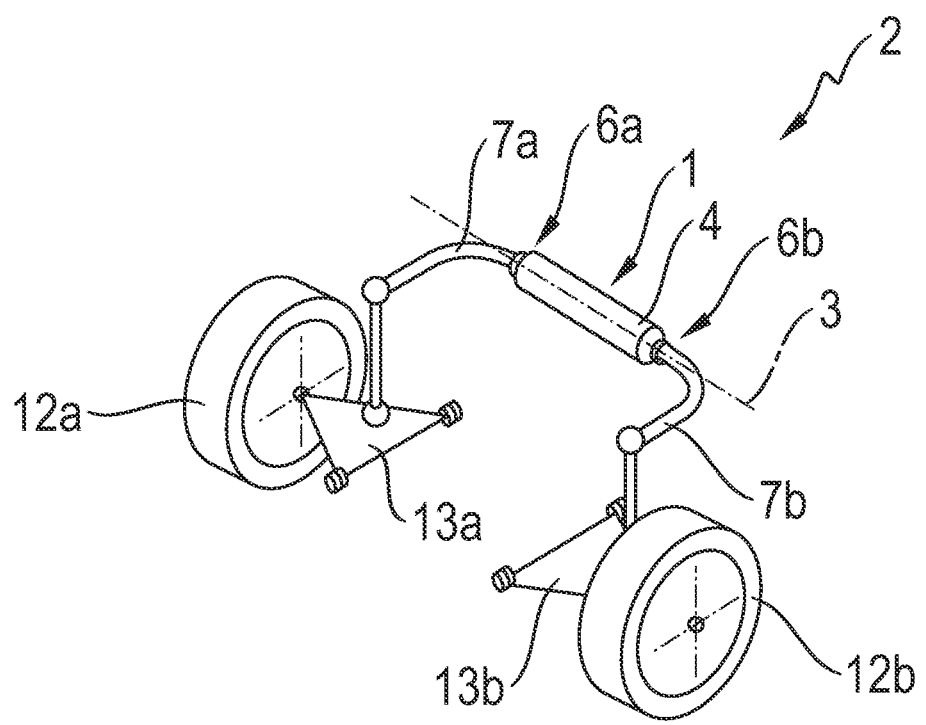
FIG. 1: A schematic view of an adjustable roll stabilizer of a motor vehicle.

To illustrate the field of application of the invention, FIG. 1 shows first a schematic view of an adjustable roll stabilizer 2. The adjustable roll stabilizer 2 is part of a not completely shown chassis of a motor vehicle (not shown). A first wheel 12a and a second wheel 12b, arranged on the opposite sides of the vehicle, are in each case connected to the body of the motor vehicle by way of transverse control arms 13a and 13b respectively and by further chassis components, not shown for the sake of simplicity. Thus—in a simplified manner—the wheel 12a and the control arm 13a, and the wheel 12b and the control arm 13b, form respective wheel suspensions. Each of these wheel suspensions is coupled to an end of an associated stabilizer section 7a and 7b of the adjustable roll stabilizer 2. In the middle of the vehicle the two stabilizer sections 7a and 7b are connected to one another via an actuator device 1.

In a manner known as such, the adjustable roll stabilizer 2 is mounted rotatably about a rotational axis 3 relative to the vehicle body (which is not shown further). The actuator device 1, in this case represented as a cylindrical body, comprises a housing 4 which is essentially rotationally symmetrical relative to the rotational axis 3, in which housing an electric motor and a multi-step planetary gear system are arranged (not shown in this representation). By way of the electric motor and the gear system the stabilizer sections 7a and 7b are in driving connection with one another. When the electric motor is static the two stabilizer sections 7a, 7b are connected solidly with one another via the actuator. By operating the electric motor, the stabilizer sections 7a, 7b can be twisted about the rotational axis 3 relative to one another, depending on the rotational direction of the electric motor. In that way the adjustable roll stabilizer 2 can be adjusted in a manner known as such.

Figure 2:
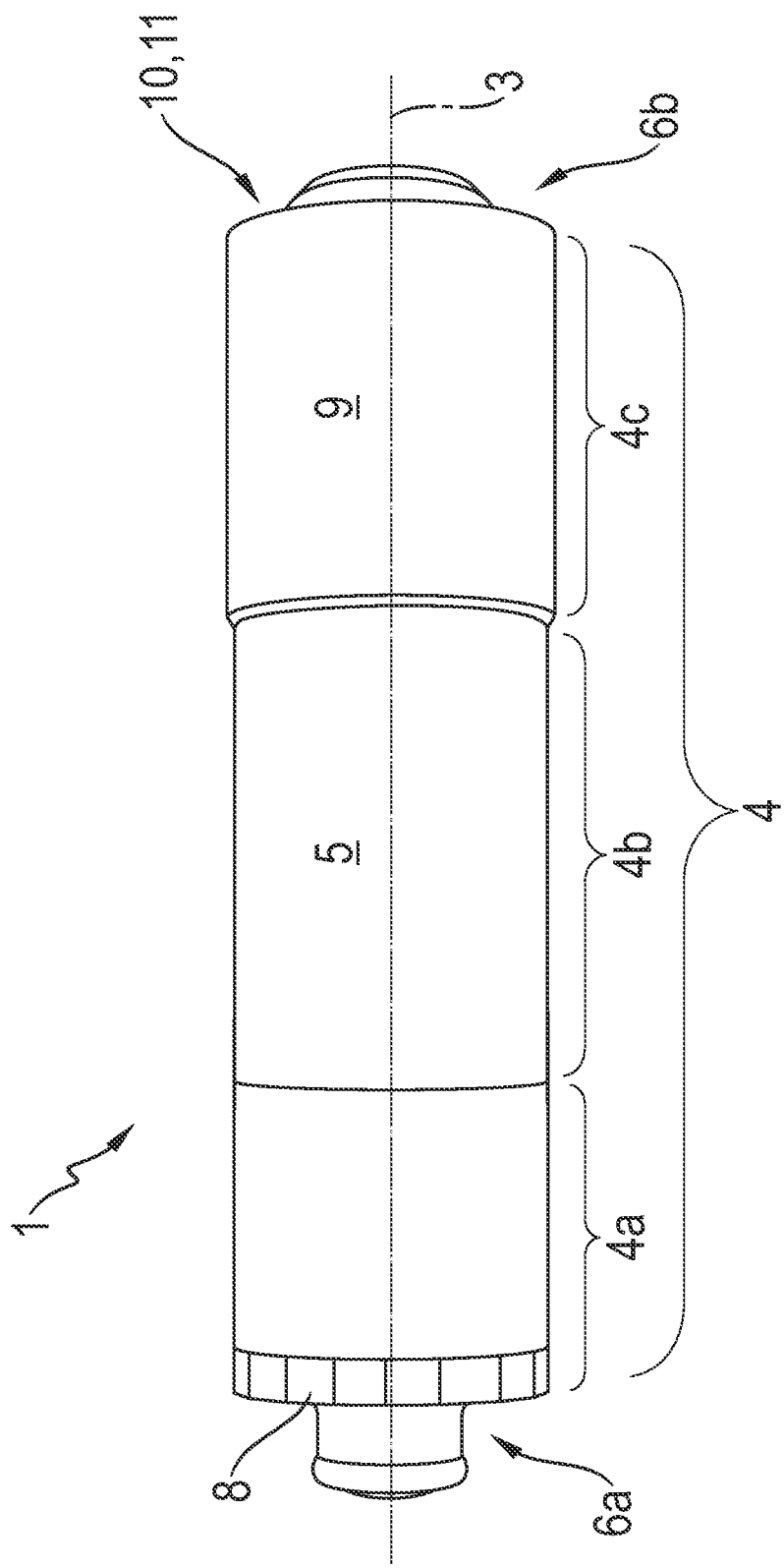
FIG. 2: A side view of an actuator device according to the single example embodiment.
Figure 3:
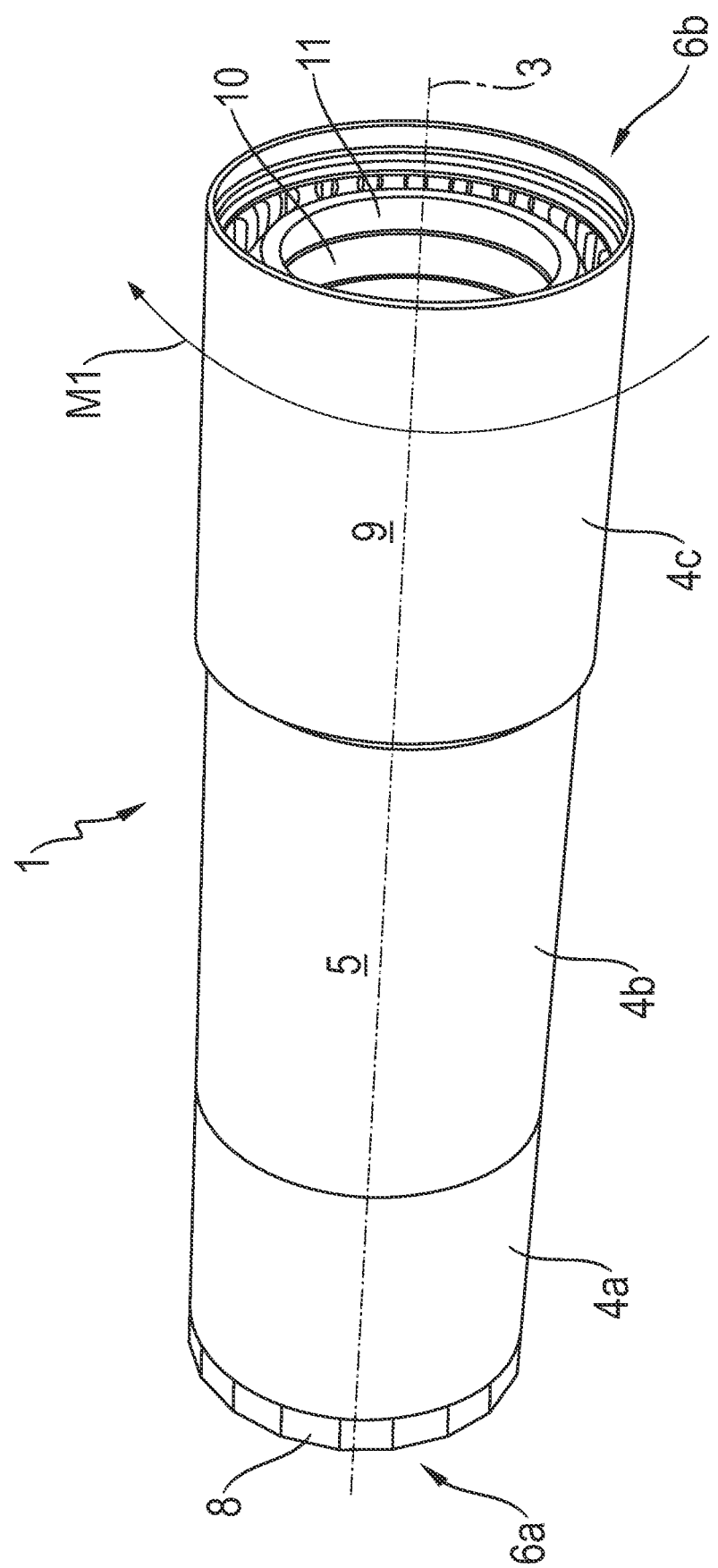
FIG. 3: The actuator device according to the single example embodiment, viewed obliquely from the side.
Figure 4:
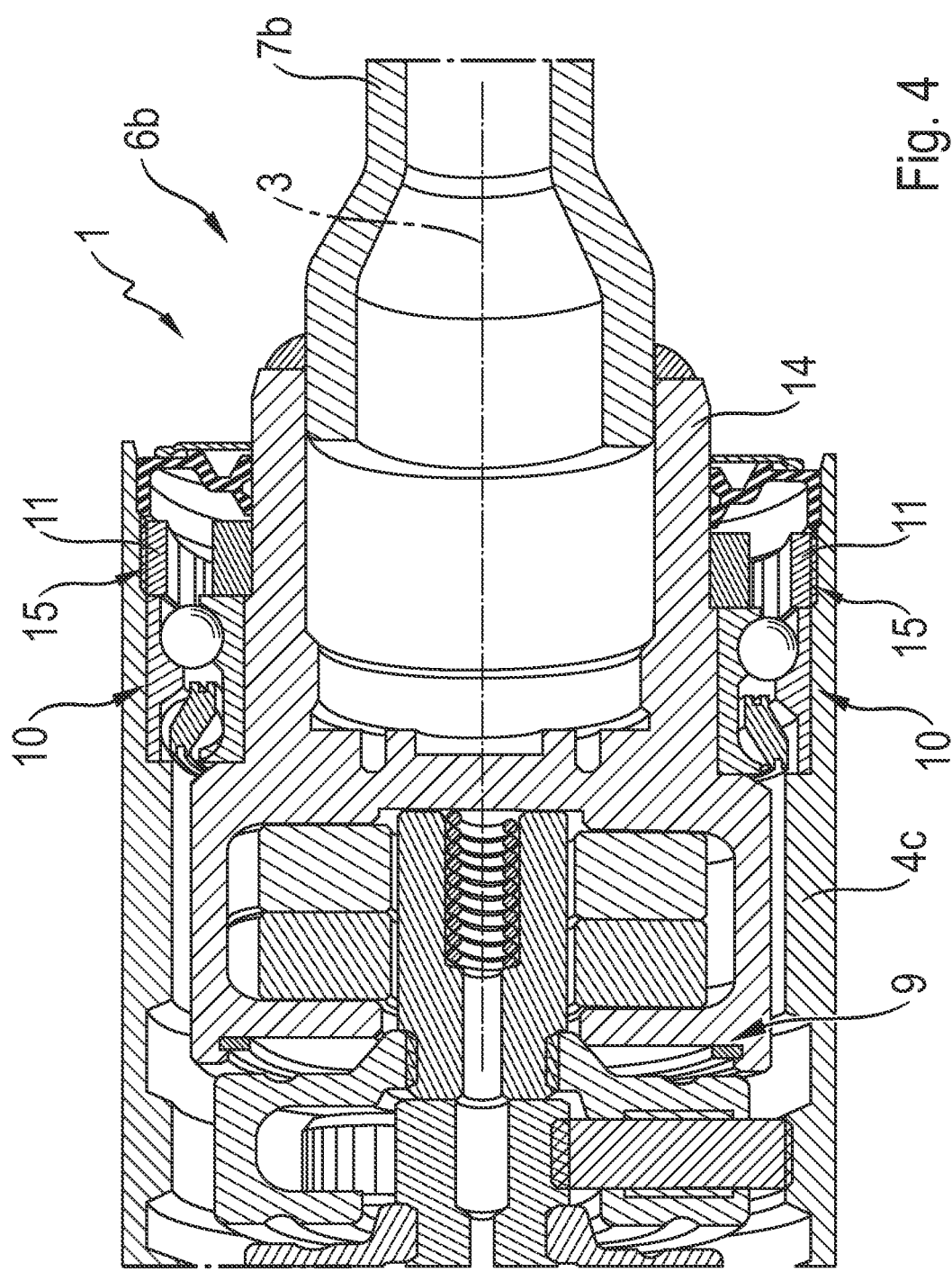
FIG. 4: The actuator device of the single example embodiment, represented partially in cross-section with the stabilizer section fitted on it.

FIGS. 2 to 4 show various views of an actuator device 1 according to the single example embodiment of the invention, wherein the same components are given the same indexes. The description of the structure and mode of operation given below therefore relates to all of the FIGS. 2 to 4.

FIG. 2 shows the actuator device 1 for a roll stabilizer 2 of a motor vehicle as represented schematically in FIG. 1. The actuator device 1 has an essentially cylindrical external basic shape, with a housing 4 that extends in the direction of the rotational axis 3. Thus, relative to the rotational axis 3 the housing 4 is essentially rotationally symmetrical. As indicted by the curly brackets, the housing 4 is divided into three segments 4a, 4b and 4c. These three segments, a housing cover section 4a, an intermediate housing section 4b and a housing bearing section 4c, are respectively welded to one another in a circumferential area to make a hollow body that forms the housing 4.

In a manner known as such, inside the housing 4 are arranged an actuator 5 in the form of an electric motor and a multi-step planetary gear system 9. As represented in FIG. 2, the locations of the actuator 5 and the multi-step gear system 9 are indicated. As shown, the actuator 5 is closer to an end 6a of the actuator device 1 fixed on the housing, whereas the multi-step planetary gear system 9 is closer to an output-side end 6b of the actuator device 1. In the installed condition (see FIG. 1), the end 6a fixed to the housing is connected to the stabilizer section 7a, while the output-side end 7b is connected to the stabilizer section 7b.

As can be seen in FIG. 4, which shows a cross-section through the housing bearing section 4c of the actuator device 1, the multi-step planetary gear system 9 has on its output side a planetary carrier 14 which in the example shown is welded to the stabilizer section 7b. The planetary carrier 14 is fitted by means of a drive bearing 10 in the form of a double-row bearing so that it can rotate about the rotational axis 3 relative to the housing bearing section 4c (part of the housing 4). To assemble the actuator device 1, the drive bearing 10 is pushed into the housing bearing section 4c in the axial direction (rotational axis 3). To axially secure the drive bearing 10, an internal thread 15 is formed on the housing bearing section 4c, into which thread a threaded ring 11 is screwed. To screw in the threaded ring 11, a relatively large torque M1 is required (see FIG. 3) in order to produce the necessary securing force as well as self-locking. To prevent co-rotation of the housing 4 while screwing in the threaded ring 11 and at the same time to avoid damaging the housing 4 due to inappropriately tight immobilization, the housing 4 has an engagement contour 8 as can be seen in FIGS. 2 and 3. The engagement contour 8 is formed circumferentially on the housing cover section 4a of the housing 3, which is located on the end 6a of the actuator device 1 opposite the bearing screw connection 11. As can be seen in FIGS. 2 and 3, the engagement contour 8 is on the end of the housing cover section 4a facing toward the end 6a fixed to the housing, so that a holding tool can easily be fitted over it in the axial direction. In the example embodiment shown, the engagement contour 8 is in the multi-faceted form. Otherwise than this, the engagement contour could be two-faceted, six-lobed, hexagonal, multi-toothed or the like.

In the example embodiment shown, the engagement contour 8 is produced by machining the housing 4 in the area of the housing cover section 4a. Alternatively or in addition, the housing 4 can be made in part as a forged component in which the engagement contour 8 is produced integrally.

With the help of the engagement contour according to the invention, the threaded ring 11 can be screwed into the housing bearing section 4c in a simple and reliable manner in order to secure the output bearing 10 axially. During this the engagement contour 8 enables simple immobilization in order to counteract a torque M1 produced as the threaded ring 11 is screwed in. Advantageously, in that way large axial securing forces can be applied and in addition the force can be adjusted by means of the screwing-in. Damage to the housing 4 of the actuator device 1 can be avoided, since the engagement contour enables interlocked holding or immobilization. Clamping of the actuator device 1 that might cause damage is thus avoided.

INDEXES

1 Actuator device
2 Roll stabilizer
3 Rotational axis
4 Housing
4a Housing cover section
4b Intermediate housing section
4c Housing bearing section
5 Actuator
6a End of the actuator device fixed to the housing
6b Output-side end of the actuator device
7a Stabilizer section (fixed to the housing)
7b Stabilizer section (output side)
8 Engagement contour
9 Multi-step planetary gear system
10 Output-side bearing
11 Threaded ring
12a Left-hand wheel
12b Right-hand wheel
13a Left-hand wheel suspension
13b Right-hand wheel suspension
14 Planetary carrier
15 Internal thread
M1 Torque

The invention claimed is:

1. An actuator device for an adjustable roll stabilizer of a motor vehicle, the actuator device comprising:
   a housing extending in a direction of a rotational axis and being mounted to rotate relative to the motor vehicle about the rotational axis,
   an actuator being arranged within the housing such that the actuator device is operable to twist first and second stabilizer sections relative to one another about the rotational axis,
   the first stabilizer section is connected to a first end of the actuator device which is rotationally fixed to a first end of the housing, and the second stabilizer section is fixed to a second end of the actuator device which is rotatable relative to the housing, and
   the first end of the housing has an outer engagement contour with a discontinuous radius, and the engagement contour being suitable for immobilizing the housing when a torque about the rotational axis is applied thereto.

2. The actuator device according to claim 1, wherein the actuator and a gear system are arranged inside the housing and are coaxial relative to the rotational axis, the gear system having an output that is rotatably supported by a bearing that is axially fixed by a threaded ring that abuts the bearing and engages an inner thread of the housing.

3. The actuator device according to claim 2, wherein the gear system is a multi-step planetary gear system and the output thereof is welded to the second stabilizer section.

4. The actuator device according to claim 1, wherein the housing is substantially of rotationally symmetrical shape.

5. The actuator device according to claim 1, wherein the housing comprises a plurality of segments welded one to another.

6. The actuator device according to claim 1, wherein the actuator is an electric motor that is operable to rotate the housing and the second stabilizer section relative to each other.

7. The actuator device according to claim 1, wherein the second end of the actuator device is an output-side end and the first end of the actuator device is an axially opposite-side end, an output-side bearing rotatably supports a gear system component relative to the housing and is arranged on the output-side end of the actuator device, and the output-side bearing is axially secured relative to the housing by a bearing screw connection in a form of a threaded ring.

8. The actuator device according to claim 7, wherein the engagement contour is formed circumferentially on an exterior surface of a housing cover section of the housing, which is arranged on the opposite-side end of the actuator device opposite the output-side end and the bearing screw connection.

9. The actuator device according to claim 1, wherein the engagement contour is configured to facilitate engagement of the housing and prevent rotation of the housing when the housing is subjected to torque during fitting of an output-side bearing screw connection.

10. The actuator device according to claim 1, wherein the engagement contour is one of a: two-faceted, a multi-faceted, a six-lobed, a hexagonal, and a multi-toothed feature.

11. The actuator device according to claim 1, wherein the engagement contour is formed by machining the housing such that a radially outer surface of the first end of the housing comprises a plurality of planar surfaces.

12. The actuator device according to claim 1, wherein the housing is made, at least in part, as a forged component with the engagement contour formed at the first end of the housing by a plurality of planar surfaces about a circumference of the housing.

* * * * *